M. E. CARTER.
STRAINER FOR SUGAR JUICE.
APPLICATION FILED AUG. 16, 1916. RENEWED FEB. 7, 1919.

1,343,078.

Patented June 8, 1920.
2 SHEETS—SHEET 1.

Inventor
Martin E. Carter
by his Attorneys
Howson & Howson

M. E. CARTER.
STRAINER FOR SUGAR JUICE.
APPLICATION FILED AUG. 16, 1916. RENEWED FEB. 7, 1919.
1,343,078.
Patented June 8, 1920.
2 SHEETS—SHEET 2.
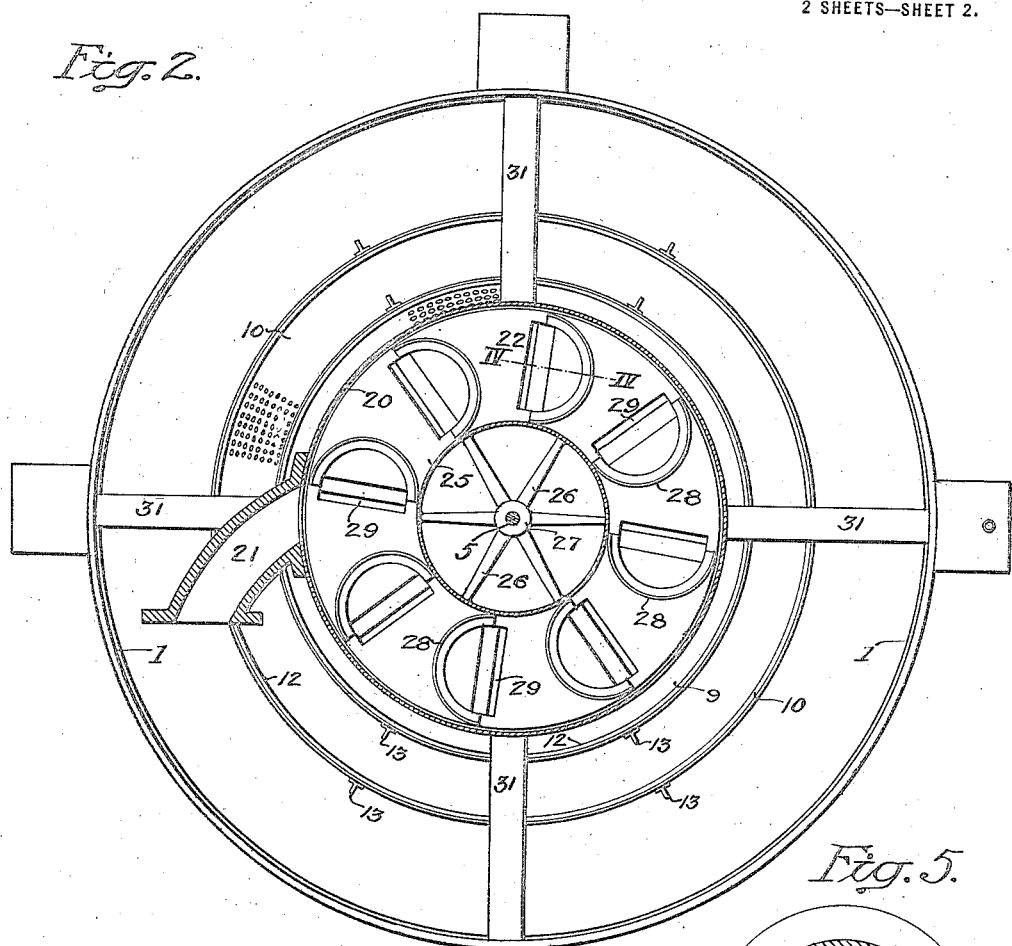
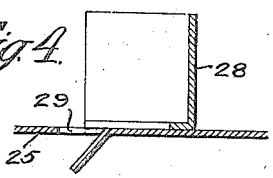
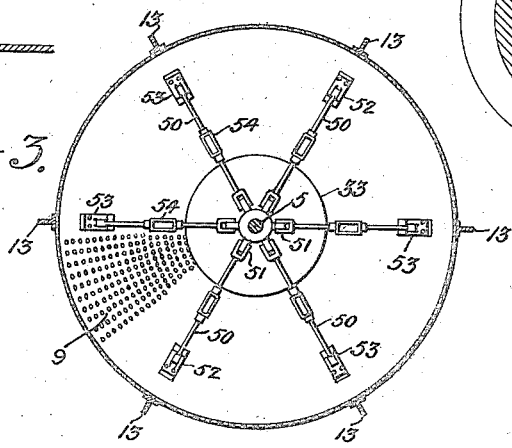
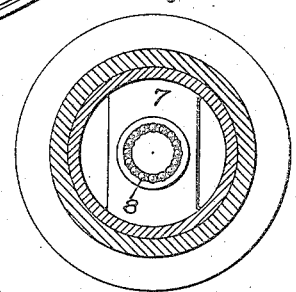
Inventor.
Martin E. Carter
by his Attorneys.
Howson & Howson

UNITED STATES PATENT OFFICE.

MARTIN E. CARTER, OF PHILADELPHIA, PENNSYLVANIA.

STRAINER FOR SUGAR-JUICE.

1,343,078.  Specification of Letters Patent.  Patented June 8, 1920.

Application filed August 16, 1916, Serial No. 115,185. Renewed February 7, 1919. Serial No. 275,677.

*To all whom it may concern:*

Be it known that I, MARTIN EARL CARTER, a citizen of the United States, residing in Philadelphia, Pennsylvania, have invented certain Improvements in Strainers for Sugar-Juices, of which the following is a specification.

My invention relates to liquid straining devices; and the object of my invention is to provide a revolving structure in which sugar juices may be strained. More particularly an improved structure has been designed for straining defecated sugar juices, although it will be understood that it may be employed for straining other liquids.

The structure forming the subject of my invention comprises a plurality of rotating strainers of foraminous or reticulated material disposed within a suitable casing, from the bottom of which the strained juice is discharged; such strainers being mounted in vertical alinement upon a shaft which may be driven or rotated by suitable means. In the present instance, I propose to effect this rotation by a turbine structure, mounted at the upper end of the shaft, which will be driven by the entering juice, and such juice may be introduced under pressure or under a sufficient head to drive the shaft with the strainer baskets at the desired speed.

While I may employ any suitable number of straining elements, in the present instance I have shown three funnel-shaped baskets, one above another; the lower basket being the largest, and these baskets comprise successively finer strainer mediums, from top to bottom. The upper baskets may be of perforated plates; the second basket having more apertures per square inch than the first; while the lower basket may be of wire gauze with considerably more apertures per square inch than the second straining basket.

My invention is more fully described hereinafter, reference being had to the accompanying drawings, in which:

Fig. 2, is a plan view, partly in section on the line II—II, Fig. 1.

Fig. 3, is a sectional plan view on the line III—III, Fig. 1, showing the upper strainer.

Fig. 4, is a sectional view of one of the turbine buckets, on the line IV—IV, Fig. 2, and Fig. 5, is a sectional plan view on the line V—V, Fig. 1.

Figure 1:
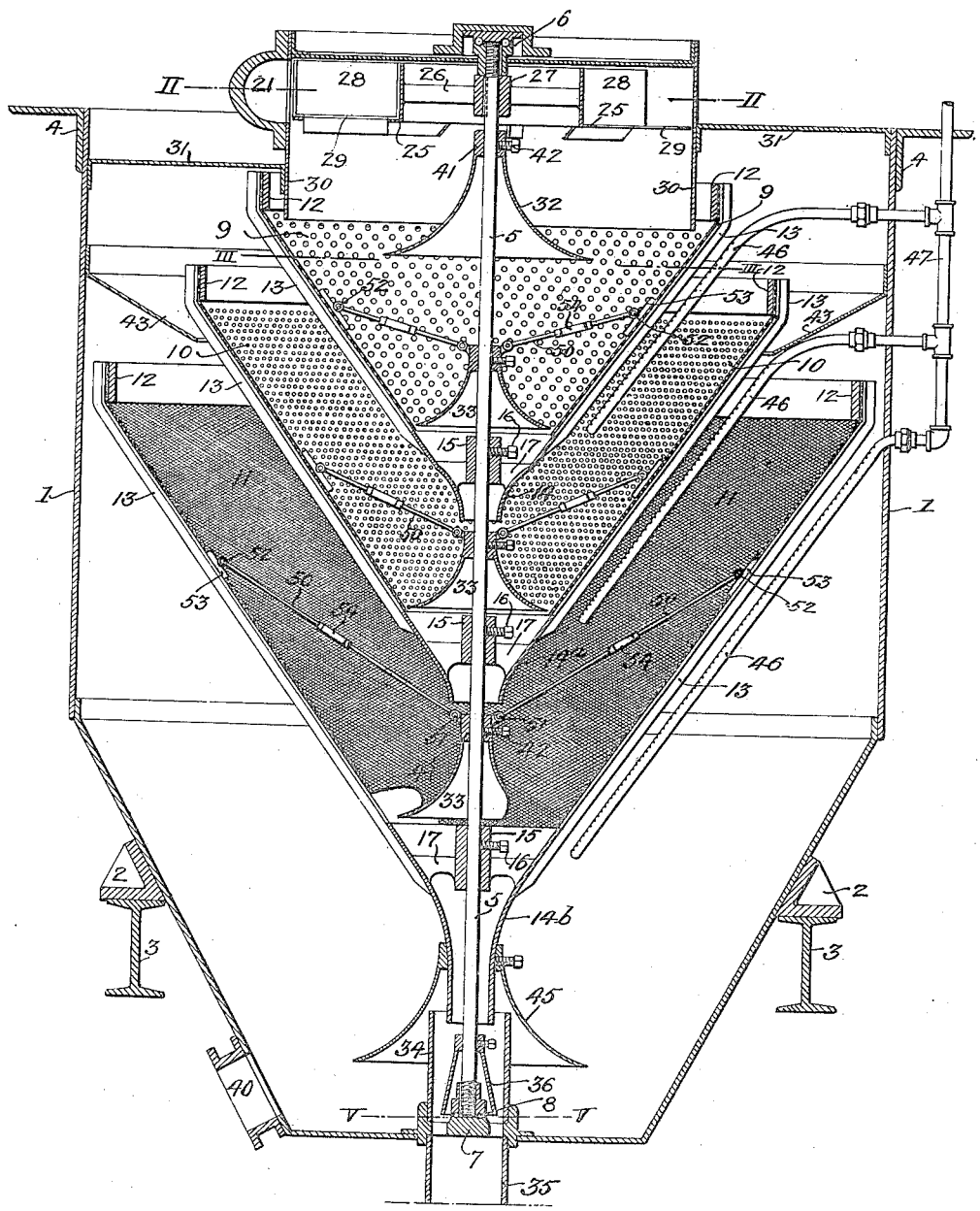
Figure 1, is a sectional elevation of the improved straining device made in accordance with my invention.

In the drawings, 1 represents a suitable casing within which the funnel-shaped screens or strainers may be contained. This casing may be provided with an annular ring 2 whereby it may be supported by floor beams 3 or other means, and the top of the structure may be braced or stayed by suitable brackets 4. Centrally disposed with respect to the casing and the screens is a shaft 5, having a ball bearing 6 suitably mounted at the upper end of the structure, and a step bearing 7, with an interposed ball race 8, at the bottom of the casing.

Within this casing are a plurality of funnel-shaped strainers or screens 9, 10 and 11, of suitable foraminous or reticulated material, which may be perforated plates or wire gauze, and these strainers or screens are preferably progressively finer from top to bottom of the structure. Each of the strainers or screens includes an annular ring 12 at the top, to which ribs 13 may be secured externally of the strainer or screen; the lower ends of said ribs being connected to tubular members 14, 14$^a$ and 14$^b$, respectively, forming discharge outlets for the screens; each of said tubular outlets having hubs 15 whereby they may be secured to the shaft 5 by set screws 16, the hubs having bracing arms or spokes 17 connecting them with the members 14.

At the upper portion of the structure, I provide a casing 20 to which the juice may be delivered from an inlet opening 21. Within the chamber 22 formed by this casing is a turbine structure secured to the shaft 5 whereby the entering juice may drive said shaft and the screens or strainers carried thereby. This turbine structure may comprise a suitable plate 25, supported by arms 26, carried by a hub 27, secured to the shaft 5, and having a plurality of buckets 28. The plate 25 is apertured at 29 directly adjacent each bucket so that the juice may drop away from the plate as well as discharge from the outer edge of said plate against the wall of the casing 20. The juice enters the casing at an angle tangent to the buckets, and striking the same effects rotation of the shaft. The casing 20 is provided with a depending flange or guard 30, which may be stayed and held in proper position by means of braces 31 interposed between the same and the casing wall 1; such guard insuring discharge of all the entering juice into the screen or strainer 9.

Carried by the shaft 5, directly below the turbine structure, is a conical deflector 32 so disposed that any juice dropping from the chamber 22 toward the center of rotation will be thrown by said deflector toward the screen. At the lower part of the screen, a second deflector 33 is mounted, substantially closing the bottom of the screen except for a narrow annular outlet, which deflector serves to guide the juice toward the screen and prevent as much as possible from entering the tubular outlet member 14, with the separated dirt, &c.

Any dirt separated or strained from the juice by the screen will pass down the walls of the same and through the open mouths of the outlet members 14, 14$^a$, or 14$^b$, of the screens into the succeeding screen where it may be subjected to further screening action, and so on until it empties from the lower screen 14$^b$ into a pipe 34 which is in communication with a pipe 35 through which all the dirt and separated matter removed from the juice discharges. The lower ball bearing may be protected by a conical deflector 36 disposed within the pipe 34. The strained juice, from which the dirt and any other objectionable matter has been removed, passes from the casing 1 through the outlet 40.

Each of the screens is provided with a lower deflecting member 33 to guide the juice toward the straining wall of the same. These deflectors have hubs 41 whereby they may be secured to the shaft, and a set screw 42 may be employed for this purpose. By this means they are capable of any adjustment on the shaft 5 that may be necessary. Carried by the casing above the upper edge of the lower screen or strainer, I may provide a deflector pan 43 to insure that all juice entering the straining structure actually passes through the screens. This pan 43 also serves the purpose of keeping dirt and dust away from the strained juice flowing into the lower part of the casing 1, prior to its discharge therefrom.

To prevent any strained juice passing into the discharge pipe 34 with which the outlet from the lower screen communicates, the member 14$^b$ of the latter, which is slightly longer than those of the upper screens, is provided with a deflector 45 whereby any juice following down the screen or ribs may be thrown outwardly for discharge from the casing and away from the point of delivery of the dirt and filtered material; such deflector overlying the discharge pipe 34.

In order that the screens may be cleaned of any collected matter should such action ever become necessary, I may provide steam jets for the purpose. To this end, pipes 46 may be introduced at one side of the apparatus and be disposed directly adjacent the screens, at the same angle and parallel therewith. These pipes are suitably connected to a manifold pipe 47, in communication with a source of supply, so that cleaning of the screens may be effected while the machine is in operation. The cleaning of the screens may go on while the juice is being strained, or it may be done after straining has been effected.

I preferably stay the several screens with respect to the shaft 5 by means of suitable rods 50, pivotally connected at 51 to the hubs 41 of the deflectors 43, and at 52 to brackets 53, secured to the ribs 13 of the respective screens, whereby I am able to avoid all danger of the screens running out of true. These stay rods are preferably provided with turnbuckles 54 to permit adjustment with respect to the screen walls and shaft and insure proper alinement; insuring proper operation of the screens.

I claim:

1. In a strainer for sugar juices and the like, the combination of a casing, a vertical shaft mounted therein, a deep funnel-shaped straining screen carried by said shaft, means for introducing juice to said screen, means for rotating the screen, a substantially cone-shaped member forming a contracted annular outlet adjacent the bottom of the screen and serving to divert the bulk of the juice for passage through said screen, and separate outlets leading from the bottom of the casing for the discharge of juice and the material strained therefrom.

2. In a strainer for sugar juices and the like, the combination of a casing, a vertical shaft mounted therein, a deep funnel-shaped straining screen carried by said shaft, a juice-receiving chamber at the upper part of the casing, means for introducing juice tangentially to said chamber, a disk having buckets carried by said shaft and disposed within said chamber whereby the entering juice may impinge on said buckets to drive the shaft and rotate the screen; said juice discharging from the buckets to the screen, a substantially cone-shaped member disposed within the screen and forming a contracted annular outlet adjacent the bottom of the same; said member serving to divert the bulk of the juice for passage through said screen, and separate outlets leading from the casing for the discharge of juice and material strained therefrom.

3. In a strainer for sugar juices and the like, the combination of a casing, a vertical shaft mounted thereon, a plurality of deep funnel-shaped straining screens carried by said shaft, a juice-receiving chamber at the upper part of the casing, a disk having buckets carried by said shaft and disposed within said chamber, means for introducing juice tangentially to said chamber whereby it may impinge upon the buckets to drive the shaft and rotate the several screens; said juice dropping from the buckets to the upper screen, each of said screens having a substantially cone-shaped member disposed within the same and forming a contracted annular outlet adjacent the bottom thereof; said member serving to divert the bulk of the juice for passage through said screen, and separate outlets for the strained juice and material strained therefrom.

4. The combination, in a sugar strainer, of a casing, a vertical revoluble shaft, a plurality of inverted conical screens carried by said shaft, said screens increasing in fineness from top to bottom of the structure, conical deflectors within said screens adjacent the bottoms of the same and serving to divert the bulk of the juice for passage through said screens; said deflectors providing narrow annular passages between the same and the wall of the respective screens, and means disposed at the top of the shaft for effecting rotation of the same and the screens carried thereby by the incoming juice.

5. The combination, in a sugar juice strainer, of a casing, a vertical revoluble shaft, a plurality of inverted conical screens carried by said shaft, said screens increasing in fineness from top to bottom of the structure, a conical deflector within each of said screens and forming a contracted annular outlet adjacent the bottom of the same, a turbine structure at the upper end of the shaft for rotating said screens comprising an apertured disk with buckets, a pipe for delivering the incoming juice tangentially to the buckets of said turbine structure, and separate outlets leading from the casing for the strained juice and the material separated therefrom.

6. In a straining device for sugar juices, the combination of a casing, a vertically disposed revoluble shaft mounted in said casing, bearings at top and bottom of the structure for said shaft, a plurality of deep funnel-shaped straining screens carried by said shaft, adjustable juice deflectors carried by said shaft and forming contracted annular outlets adjacent the bottoms of said straining screens, an apertured disk carried by the upper end of the shaft, buckets carried by the upper side of said disk adjacent the apertures therein, and a pipe for delivering the juice to be strained tangentially to said buckets whereby the shaft and the screens may be driven thereby.

7. In a strainer for sugar juices and the like, the combination of a casing, a vertical shaft mounted therein, a straining screen carried by said shaft, a conical juice deflector carried by the shaft adjacent the bottom of said screen and forming a contracted annular outlet therefor, and adjustable stay rods connected between the wall of the screen and the upper part of said juice deflector.

8. In a strainer for sugar juices and the like, the combination of a casing, a vertical shaft mounted therein, a straining screen carried by said shaft, an adjustable conical juice deflector carried by the shaft adjacent the bottom of said screen and forming a contracted annular outlet therefor, and adjustable stay rods connected between the wall of the screen and the upper part of said adjustable juice deflector.

9. In a strainer for sugar juices and the like, the combination of a casing, a vertical shaft mounted therein, a plurality of screens carried by said shaft, discharge members secured to the lower ends of said screens and connected to the shaft, juice deflectors carried by the shaft above said discharge members and forming contracted annular outlets for the screens, and stay rods mounted relatively adjacent the upper portions of the screens and connecting the same with the upper portion of said juice deflectors.

10. In a strainer for sugar juices and the like, the combination of a casing, a vertical shaft mounted therein, a plurality of screens carried by said shaft, discharge outlet members secured to the lower ends of said screens and connected to the shaft, adjustable juice deflectors carried by the shaft and forming contracted outlets adjacent the bottoms of the screens; said juice deflectors being mounted directly above the discharge outlet members, and adjustable stay rods mounted relatively adjacent the upper portions of the screens and connecting the same with the juice deflectors carried by the shaft.

11. In a strainer, the combination of a straining screen, a shaft upon which said screen is axially mounted, means for introducing juice to said screen, a turbine wheel carried by the upper end of the shaft against which the incoming juice strikes; said turbine serving to move the shaft and the screen attached thereto, a casing inclosing said turbine and depending into the screen to insure proper delivery of the entering liquid thereto, and a deflector carried by said shaft for diverting entering liquid to the screen.

12. In a strainer, the combination of a plurality of straining screens, a shaft upon which said screens are axially mounted, means for introducing juice to the upper screen, a turbine wheel carried by the upper end of the shaft against which the incoming juice strikes; said turbine serving to move the shaft and the screens attached thereto, a casing inclosing said turbine and depending into the upper screen to insure proper delivery of the entering liquid thereto, and deflectors carried by said shaft for diverting the falling liquid to the several screens.

13. In a strainer, the combination of a plurality of straining screens, a shaft upon which said screens are axiallly mounted, means for introducing juice to said strainer, means for rotating the shaft and the screens attached thereto, a casing communicating with said juice inlet and depending into the upper screen to insure proper delivery of the entering liquid thereto, and a series of deflectors carried by said shaft and disposed within the respective screens for diverting the falling liquid for passage through the same.

14. In a strainer for sugar juices and the like, the combination of a casing, a vertical shaft mounted therein, a funnel-shaped straining screen carried by said shaft, means for introducing juice to said screen, means for rotating the screen, and means carried by the shaft within the screen to form a contracted annular outlet adjacent the bottom of said screen and serving to divert the bulk of the juice passing through said screen to the foraminous wall of the same.

15. In a strainer for sugar juices and the like, the combination of a casing, a vertical shaft mounted therein, a plurality of funnel-shaped straining screens carried by said shaft, means for introducing juice to said screens, means for rotating the screens, and means carried by the shaft within the respective screens to form contracted annular outlets adjacent the bottoms of said screens and serving to divert the bulk of the juice passing through said screens to the foraminous walls of the same.

16. In a strainer for sugar juices and the like, the combination of a casing, a vertical shaft mounted therein, a plurality of funnel-shaped straining screens carried by said shaft, means for introducing juice to said screens, means for rotating the screens, means carried by the shaft within the respective screens to form contracted annular outlets adjacent the bottoms of said screens and serving to divert the bulk of the juice passing through said screens to the foraminous walls thereof, separate outlets leading from the bottom of the casing for the discharge of juice and the material strained therefrom, and an annular deflector carried by the lower screen and guarding the outlet for the material strained from the juice.

MARTIN E. CARTER.